Aug. 16, 1955     W. L. TUCKER     2,715,415
HIGH PRESSURE FLOAT VALVE
Filed June 9, 1950
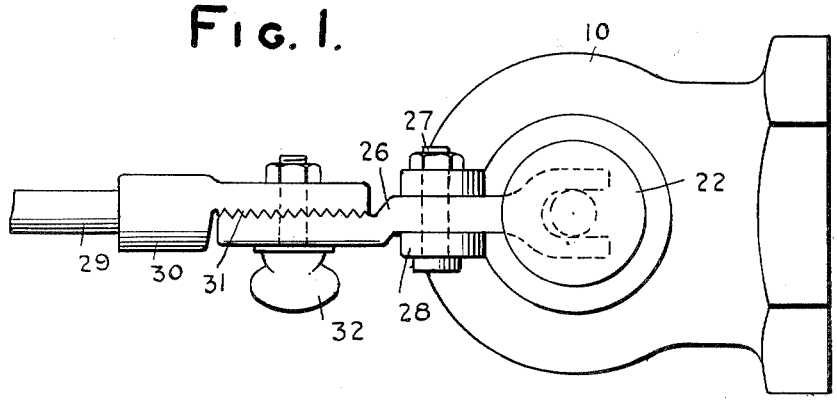
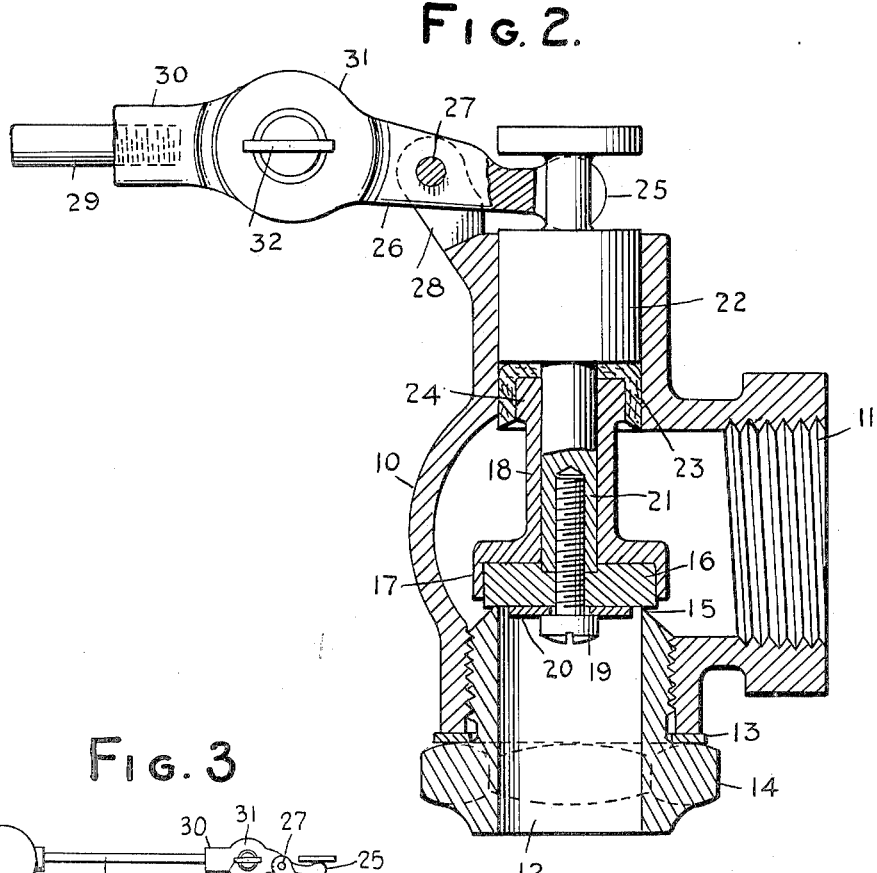
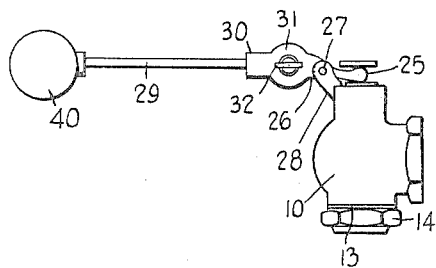
*INVENTOR.*
WELSEY LEE TUCKER
By *Emery Holcombe & Blair*
ATTORNEYS.

United States Patent Office 2,715,415
Patented Aug. 16, 1955

2,715,415

HIGH PRESSURE FLOAT VALVE

Welsey Lee Tucker, Shandon, Calif., assignor, by mesne assignments, of one-half to Leslie W. Nuckolls and one-half to Roderick Nuckolls Application June 9, 1950, Serial No. 167,211

4 Claims. (Cl. 137—442)

This invention relates to automatic valves for operation on fluid systems under pressures varying from twenty to several hundred pounds, and particularly applies to float controlled valves for stock watering troughs, poultry drinking fountains and flush tanks, although not restricted to such uses.

The invention aims to provide a hydraulically balanced valve readily operated by means of a small float, and sufficiently sensitive to changes in the fluid level of the tank or other receptacle which it feeds to maintain a substantially constant depth of fluid and prevent overflowing at any time.

Further aims are to prevent changes in the water pressure from affecting the position of the valve as determined by the float or other control means, to prevent sand and dirt from depositing on the valve seat, and to provide against chattering, slamming, leakage and derangement or deterioration of the operating parts in service.

The invention has the advantages of being simple in design, comparatively cheap to manufacture, requiring no highly accurate fits, and the parts subject to wear are relatively long lived and readily replaceable.

In the accompanying drawings, which illustrate a preferred form of the invention, Figure 1 is a top plan view of a float operated valve with the float arm broken off and the float removed, Figure 2 is a central vertical cross section thereof showing the end of the float arm in side elevation, and Figure 3 shows on a reduced scale the exterior of the valve with the float attached thereto. The same reference characters are used to designate the same parts in both views.

Referring to the drawings, the valve body 10 is made of red brass or other readily fabricated non-corrosive material suitable to the service for which the device is intended, and is provided with an internally threaded flange connection 11 at one side for the supply pipe and an internally threaded bottom opening to receive the removable valve seat member 12, preferably made of the same material as the valve body, which is screwed in place therein with a copper gasket 13 between the lower edge of the body and a hexagonal flange 14 on the other end of the valve seat member to seal the joint between them. The valve seat member 12 is tubular and also serves as an outlet pipe or spout for conducting fluid from the valve into the tank or receptacle to be supplied. The valve seat 15 at the upper end of the member 12 is conical and slopes downwards and outwards, the sharp upper edge thereof being of the same diameter as the tubular opening through the valve seat member.

The valve 16 is made of a softer material than the valve seat, preferably rubber, neophrene, or other natural or synthetic substance not affected by acid or alkali conditions of the water or other fluid likely to come in contact therewith and tough enough to withstand repeated contact with the sharp edge of the valve seat. The valve seat is retained in a cup shape flange 17 on the lower end of a tubular valve element 18 by means of a screw 19 bearing against a washer 20, both preferably made of non-corrodible material, and which screw engages in a threaded bore in the lower end of the valve stem 21, which slides up and down in a cylindrical opening in the top part of the housing 10 in axial alinement with the tubular valve seat member 12, being guided therein by means of an enlargement or piston 22. The piston 22 and the opening in which it slides are substantially the same size as the opening in the valve seat member, and a cup-leather 23 or equivalent packing means is arranged between the under face of the piston and an annular ring or flange 24 at the top end of the tubular valve member 18, and secured in place by the screw 19.

The upper end of the valve stem 21 projects above the top of the valve body and is grooved circumferentially to receive the rounded forked end 25 of the operating lever 26, which is preferably made of brass and pivoted on a stainless steel pin 27 between two upwardly projecting lugs or ears 28 on the top of the valve body 10. The float stem 29 which carries the float 40 is usually made of brass tubing, screws into a threaded bore in the outer member 30 of an adjusting clamp 31, also preferably made of brass, on the free end of the operating lever 26, a thumb screw 32 being provided for holding the two parts of the clamp together as shown in Figure 1.

Preferably the valve 16 is made large enough to overlap the sharp edge of the seat by a substantial margin all around, as much as one eighth of an inch being found suitable for a valve seat opening of three quarters of an inch. This aids in preventing slamming and chattering of the valve in service and promotes the smooth flow of fluid through the valve at small openings. The sharp edge of the seat and angle of slope, which is preferably about 45° to the face of the valve, prevent sand and dirt from accumulating on the seat and ensure a tight closure of the valve upon the seat at all times when the float is at the normal fluid level in the tank.

In the normal operation of the valve, upon the fluid level in the tank dropping far enough to permit the float to move the valve stem against the stationary or static friction of the piston, cup leather and other operating parts of the valve, the float drops, lifting the valve stem and valve sufficiently in the valve body to separate the valve from its seat and permit fluid to escape around the entire perimeter of the latter over the conical edge thereof and through the outlet passage into the tank or receptacle containing the float, the flow continuing until the fluid level therein has raised sufficiently to lift the float and move the valve parts in the opposite direction to close the valve.

As soon as the float lifts the valve even a slight distance off the seat, the incoming water entering the valve is diverted upwardly by the tapered seat and strikes the overhanging face of the valve before discharging into the outlet, thus providing a jet action against the flat disc valve which overcomes the buoyancy of the float and gives the valve a quick opening action.

The hydraulic pressure of the fluid in the valve chamber against the cup leather 24 and back of the cup holding the valve is balanced and is much greater than the weight of the valve operating parts, which are balanced by the float, and the static friction between the cup leather and the wall of the cylindrical passage in which it slides is correspondingly greater to prevent sliding movement thereof than the tendency of the float to move up and down due to surges in the fluid in the tank, thereby preventing oscillations in the float and small movements of the valve parts interfering with the smooth flow of fluid through the valve.

The invention is not restricted to the precise shapes and dimensions of the parts of the valve shown in the drawings, but what is claimed is as follows:

1. A quick opening balanced valve for use in fluid supply system comprising a hollow body having an outlet passage in line with its principal axis, a circular valve seat the the inner end of said outlet passage concentric with said body, said valve seat projecting into said body and having its outer portion beveled away circumferentially to form a sharp edge surrounding said outlet passage, a flat circular disc valve cooperating with said valve seat with its outer edge projecting radially beyond said beveled edge, said disc valve being mounted on the inner end of a movable valve stem axially slidable in a cylindrical bore extending out of said body in line with the principal axis thereof and having the same diameter as the outlet passage, means for preventing leakage of fluid through said cylindrical bore, an inlet opening into said body between said valve seat and cylindrical bore, the outer end of said valve stem projecting out through said bore, and means cooperating with the outer end of said valve stem for positioning it axially in said bore, said means permitting rapid axial movement of said valve under pressure of fluid flowing against the face of said valve disc normally in contact with said valve seat upon movement of said valve disc away from said seat.

2. Means for regulating the level of a fluid in a receptacle associated with a source for supplying said fluid under pressure, said regulating means comprising a valve as set forth in claim 1 wherein the means engaging the outer end of the valve stem comprises a float adapted to be supported by the fluid in said receptacle carried by an adjustable arm pivotally mounted on said body intermediate its ends and formed at its inner extremity to engage the outer end of the valve stem, the inlet of said valve being connected to said source for supplying fluid under pressure and the outlet to said receptacle.

3. In a balanced float valve for tanks associated with a source of liquid under pressure and subjected to rapid changes in level of the liquid therein, the combination of a valve body, a float adapted to ride on the surface of the liquid in said tank and carried by a lever arm pivoted to said body, an inwardly tapering valve seat within said body connected with said tank and a discharge passage through said seat and body, said valve seat extending into said body and having a sharp inner edge, a flat disc valve for contacting said seat provided with a flange extending radially beyond said sharp inner edge, a valve stem provided with a flanged inner end for supporting said valve and an enlarged intermediate portion for engaging in a cylindrical bore penetrating said valve body in axial alinement with said valve and seat, a resilient means on said valve stem adjacent to said enlarged intermediate portion and having its periphery flanged to engage said cylindrical bore, said flange facing towards said seat, and inlet passage in said body connected to said source of fluid under pressure and communicating with the space between said seat and cylindrical bore, and means for operatively connecting said lever arm and valve stem at the outer end of the latter outside of said body.

4. A balanced adjustable quick opening shut-off valve for supplying liquid from a high pressure system to an open receptacle comprising a body having a chamber provided with an inlet passage for connection to said high pressure system and a discharge passage for connection to said receptacle, said passages being positioned at right angles to each other and an opening for a valve stem in alinement with the axis of said discharge passage, a circular valve seat surrounding said discharge passage, said seat being beveled outwardly away from said discharge passage to provide a frusto-conical face and a sharp inner edge, a valve disc of greater diameter than said sharp edge having a flange extending outwardly beyond said sharp edge at an acute angle with respect to said frusto-conical face and at an angle of not more than 90 degrees with respect to the longitudinal axis of said seat, said disc being mounted on a stem slidably engaging in said valve stem opening, means for adjusting the position of said stem in said opening, and means on said stem for frictionally engaging said opening in response to pressure of fluid in said valve chamber, in which liquid at a high pressure is deflected by said frusto-conical face against said valve disc to separate it from said seat when said seat is moved in the direction to open said valve.

References Cited in the file of this patent

UNITED STATES PATENTS

| | | |
|---|---|---|
| 352,643 | Demarest | Nov. 16, 1886 |
| 404,266 | Dowling | May 28, 1889 |
| 418,276 | Craigie | Dec. 31, 1889 |
| 439,730 | Keyworth | Nov. 4, 1890 |
| 453,069 | Vosburgh | May 26, 1891 |
| 518,004 | Keyworth, Jr. | Apr. 10, 1894 |
| 538,772 | Fox | May 7, 1895 |
| 566,108 | Wood | Aug. 18, 1896 |
| 606,404 | Burnett | June 28, 1898 |
| 966,417 | Atkins | Aug. 9, 1910 |
| 1,149,722 | Buckley | Aug. 10, 1915 |
| 1,171,619 | McGuire | Feb. 15, 1916 |
| 1,579,140 | Phillips | Mar. 30, 1926 |
| 1,887,235 | Cornelius | Nov. 8, 1932 |
| 2,164,927 | Kohler | July 4, 1939 |
| 2,510,991 | Mazzeo | June 13, 1950 |

FOREIGN PATENTS

| | | |
|---|---|---|
| 17,839 | Great Britain | Aug. 14, 1902 |